United States Patent [19]
Cuevas

[11] Patent Number: 5,566,976
[45] Date of Patent: Oct. 22, 1996

[54] DUAL STAGE AIR BAG INFLATOR WITH TOROIDAL CHAMBER FOR COMBUSTIBLE GAS MIXTURE

[75] Inventor: Jess A. Cuevas, Scottsdale, Ariz.

[73] Assignee: TRW Inc., Lyndhurst, Ohio

[21] Appl. No.: 523,017

[22] Filed: Sep. 1, 1995

[51] Int. Cl.⁶ .................................................. B60R 21/26
[52] U.S. Cl. ............................................ 280/737; 280/742
[58] Field of Search ...................................... 280/736, 737, 280/741, 742

[56] References Cited

U.S. PATENT DOCUMENTS

| | | | |
|---|---|---|---|
| 3,868,124 | 2/1975 | Johnson | 280/737 |
| 3,877,721 | 4/1975 | Brown, Jr. . | |
| 3,901,530 | 8/1975 | Radke . | |
| 3,930,666 | 1/1976 | Lynch et al. | 280/737 |
| 3,985,375 | 10/1976 | Lewis et al. | 280/737 |
| 5,221,109 | 6/1993 | Marchant | 280/736 |
| 5,263,740 | 11/1993 | Frey et al. | 280/737 |
| 5,344,186 | 9/1994 | Bergerson et al. | 280/741 |
| 5,348,344 | 9/1994 | Blumenthal et al. | 280/737 |
| 5,351,988 | 10/1994 | Bishop et al. | 280/737 |
| 5,378,018 | 1/1995 | Ketterer et al. | 280/737 |

*Primary Examiner*—Paul N. Dickson
*Attorney, Agent, or Firm*—Tarolli, Sundheim, Covell, Tummino & Szabo

[57] ABSTRACT

An apparatus comprises a container (22) that defines a chamber (24) for receiving a mixture of gases. The mixture of gases comprises a combustible fuel gas portion and a noncombustible inflation gas portion for inflating an air bag (B). An outlet passage (100) is formed in the container (22) and provides fluid communication between the chamber (24) and the air bag (B) through a flow area. The outlet passage (100) is initially blocked to prevent fluid flow through the passage. An actuatable first initiator (122), when actuated, effects ignition of the combustible fuel gas portion of the mixture of gases and unblocking of the outlet passage (100) to allow gas to flow into the air bag (B). An actuatable second initiator (202), when actuated, changes the flow area of the outlet passage (100).

21 Claims, 4 Drawing Sheets

5,566,976

DUAL STAGE AIR BAG INFLATOR WITH TOROIDAL CHAMBER FOR COMBUSTIBLE GAS MIXTURE

BACKGROUND OF THE INVENTION

1. Technical Field

The present invention relates to an inflatable vehicle occupant protection system. In particular, the present invention relates to a dual stage air bag inflator having a toroidal chamber for storing a mixture of gases including a combustible gas.

2. Description of the Prior Art

Known structures for inflating a vehicle air bag typically include a container for solid ignitable material, inflation fluid in the form of air or other gas, or inflation fluid with a relatively small amount of a solid ignitable material. The known structures are actuatable to inflate air bags upon the occurrence of an event requiring inflation of the air bags, such as a collision of a predetermined severity. In one type of structure, the solid ignitable material is ignited to generate a gas for inflating the air bag. In another type of structure, the stored inflation fluid is discharged from the container for inflating the air bag. In yet another type of structure, the relatively small amount of ignitable material is ignited to produce combustion products which heat the stored inflation fluid as the inflation fluid is discharged from the container for inflating the air bag.

U.S. Pat. No. 5,348,344 discloses another type of air bag inflator. The inflator stores a gas mixture including a noncombustible inflation gas portion and a combustible gas portion. An igniter is energized to ignite the combustible gas portion which heats and pressurizes the inflation gas portion. The heated and pressurized inflation gas portion is directed into an air bag to inflate the air bag.

SUMMARY OF THE INVENTION

The present invention is directed to an apparatus including an inflatable air bag. A container defines a chamber for receiving a mixture of gases to inflate the air bag. The mixture of gases includes a combustible gas portion and a noncombustible inflation gas portion. An outlet passage is formed in the container and provides fluid communication between the storage chamber and the air bag through a flow area. The outlet passage is initially blocked to prevent fluid flow through the outlet passage. An actuatable first initiator, when actuated, effects the ignition of the combustible gas portion of the mixture of gases to unblock the outlet passage and allow gas to flow into the air bag. An actuatable second initiator, when actuated, changes the flow area of the outlet passage.

The container defines a first initiator chamber for the first initiator. The chamber for receiving the mixture of gases is a toroidal chamber and surrounds the chamber for the first initiator. The container includes a closure extending across the outlet passage to block fluid flow through the outlet passage. The closure is movable to unblock the outlet passage in response to an increase in pressure of the mixture of gases in the chamber resulting from actuation of the first initiator.

A flow passage extends between the storage chamber and the outlet passage. A cap is located in the flow passage. A quantity of ignitable material is located in the cap. The ignitable material is ignited, in response to actuation of the first initiator, to propel the cap into the chamber and to ignite the combustible gas portion of the mixture of gases. As the combustible gas portion burns, pressure of the mixture of gases in the storage chamber increases to move the closure to its unblocking position and allow flow through the outlet passage.

The container also defines another chamber for the second initiator and a passage extending between the two chambers. A member is located in the passage extending between the chambers. The member has a section that is movable, in response to actuation of the second initiator, from an initial position located out of the outlet passage to a position at least partially in the outlet passage to reduce the flow area of the outlet passage. The second initiator is actuated after actuation of the first initiator.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

A driver side air bag assembly 18 (FIG. 1) includes an inflator 20 and an air bag B. The air bag assembly 18 is attachable to a steering wheel of a vehicle, such as a passenger car, light truck and the like. The inflator 20 is actuatable to inflate the air bag B upon the occurrence of an event requiring inflation of the air bag.

The inflator 20 includes a container housing 22 having a longitudinal central axis A. The container housing 22 defines a substantially toroidal chamber 24 for receiving and storing a mixture of gases under pressure. The toroidal chamber 24 extends around the axis A of the container housing 22. The container housing 22 is made of a material that is impervious to the mixture of gases stored in the chamber 24, such as steel or an aluminum alloy, and that may be lined with a suitable material.

The mixture of gases includes a combustible gas portion and a noncombustible gas portion. The combustible gas portion of the mixture of gases preferably includes a fuel gas and an oxidizer gas for supporting combustion of the fuel gas. The oxidizer gas is preferably oxygen. The fuel gas is preferably hydrogen. The noncombustible gas portion of the mixture of gases is an inert gas for inflating the air bag B. The inert gas is preferably nitrogen, argon or a mixture of nitrogen and argon.

The mixture of gases in the inflator 20 readily burns, when ignited, but otherwise is not explosive. As such, the mixture of gases could have many different compositions. The fuel gas may be 2 to 16 molar percent of the mixture of gases. The oxidizer gas may be 7 to 98 molar percent of the mixture of gases. The balance is inert gas which may be 10 to 91 molar percent of the mixture of gases. Preferably, the mixture of gases includes 10–14 molar percent hydrogen, 15–25 molar percent oxygen, and 61–75 molar percent inert gas.

The mixture of gases in the chamber 24 is normally under pressure. The pressure depends on factors such as the volume of the vehicle occupant restraint to be inflated, the time available for inflation, the inflation pressure desired, the volume of the chamber 24 of the inflator 20 for the mixture of gases, the temperature of the container housing 22 and the percentage of each of the gases in the mixture of gases. Preferably, the mixture of gases in the chamber 24 of the inflator 20 is at a pressure in the range of about 1,000 psi to 5,000 psi, and preferably about 4,000 psi.

Figure 1:
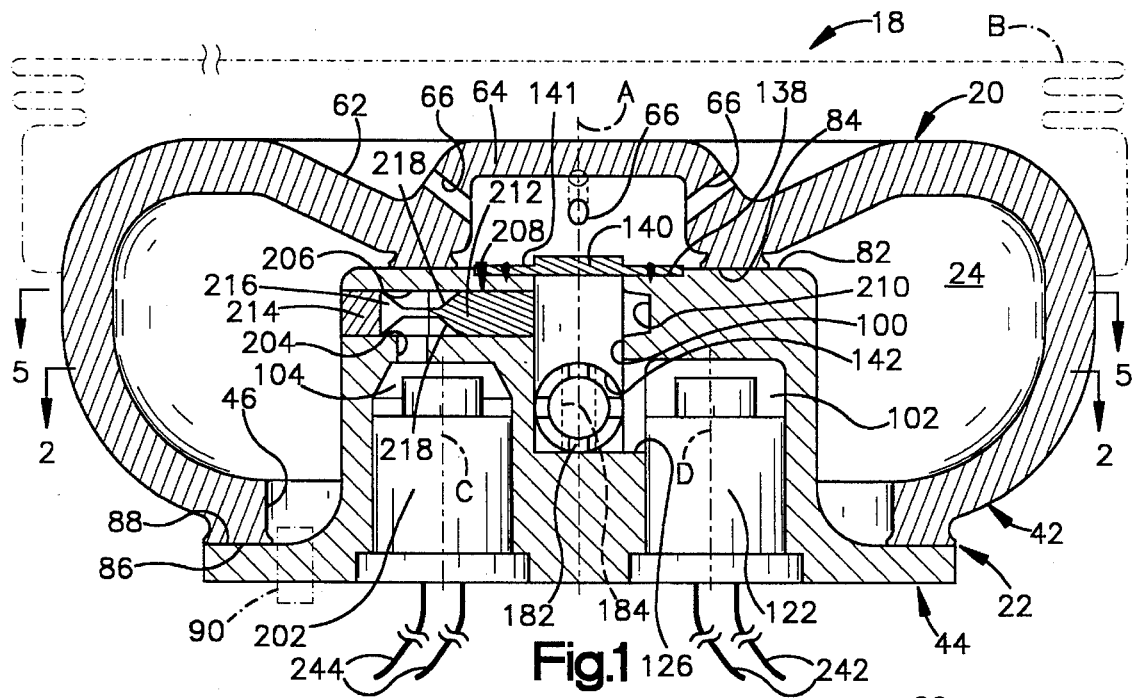
FIG. 1 is an schematic view of an air bag inflator embodying the present invention.
Figure 2:
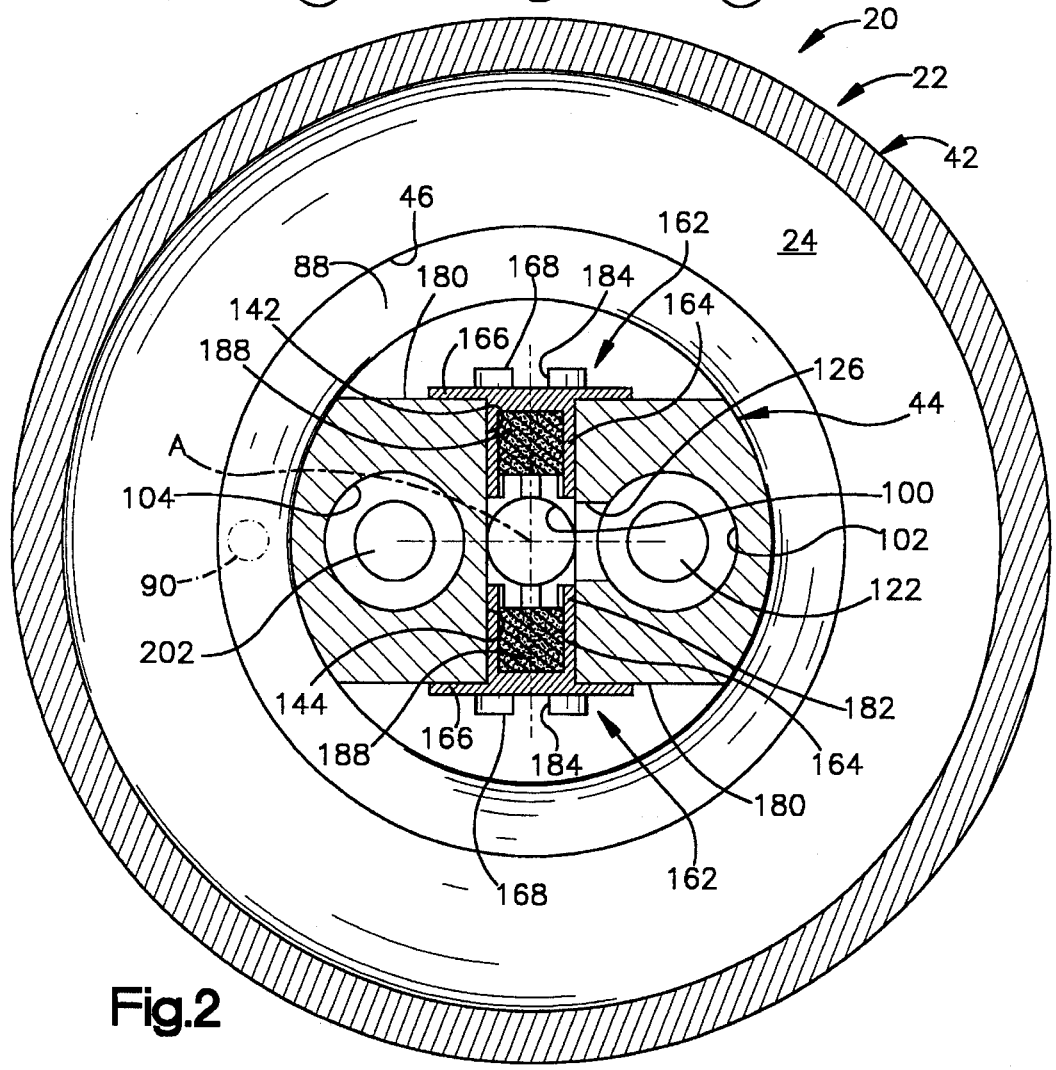
FIG. 2 is a sectional view of the inflator of FIG. 1, taken approximately along the line 2—2 in FIG. 1.

The container housing 22 includes an outer housing portion 42 and a central or inner housing portion 44 (FIGS. 1 and 2). The outer housing portion 42 is substantially cup shaped and has a central opening 46 at its bottom end portion, as viewed in FIG. 1. The inner housing portion 44 is received in the central opening 46 of the outer housing portion 42. The outer housing portion 42 radially surrounds and is fixed to the inner housing portion 44.

The outer housing portion 42 has an annular recess 62 formed in its upper end, as viewed in FIG. 1, located centrally about the axis A. The annular recess 62 defines a diffuser portion 64 of the container housing 22 projecting in an upward direction, as viewed in FIG. 1, and centrally located on the axis A. A plurality of outlet openings 66 are formed through the diffuser portion 64 to direct inflation gas into the air bag B.

The inner housing portion 44 has an axial end surface 82 which faces upward, as viewed in FIG. 1. The outer housing portion 42 has an upper annular surface 84 which is located centrally around the axis A and which faces downward, as viewed in FIG. 1. The axial end surface 82 of the inner housing portion 44 engages the upper annular surface 84 of the outer housing portion 42. The outer housing portion 42 also has a lower annular surface 86 located centrally around the axis A and encircling the central opening 46. The lower annular surface 86 faces in the same direction as the upper annular surface 84. The lower annular surface 86 engages an upward facing annular flange surface 88 of the inner housing portion 44 around the central opening 46. The inner housing portion 44 is friction welded to the outer housing portion 42 at the annular surfaces 84, 86. A fill valve assembly 90 is provided in a lower end of the inner housing portion 44 to fill the chamber 24 with the mixture of gases.

The inner housing portion 44 has an outlet passage 100 extending along the axis A of the container housing 22. The outlet passage 100 provides fluid communication between the chamber 24 and the diffuser portion 64 of the container housing 22. The outlet passage 100 has a first flow area through which gas flows into the diffuser portion 64 to inflate the air bag B.

At the upper end of the outlet passage 100, as viewed in FIG. 1, the inner housing portion 44 has a closure 140 centrally located on the axis A and fixed to a surface defining a recess 138. The closure 140 includes a mounting flange 141 which is laser welded to the surface defining the recess 138. The closure 140 initially blocks fluid flow through the outlet passage 100 between the chamber 24 and the diffuser portion 64. The closure 140 is fixed to the surface defining the recess 138 by a circumferential weld to block completely fluid communication between the toroidal chamber 24 and the diffuser 64 through the outlet passage 100.

Figure 6:
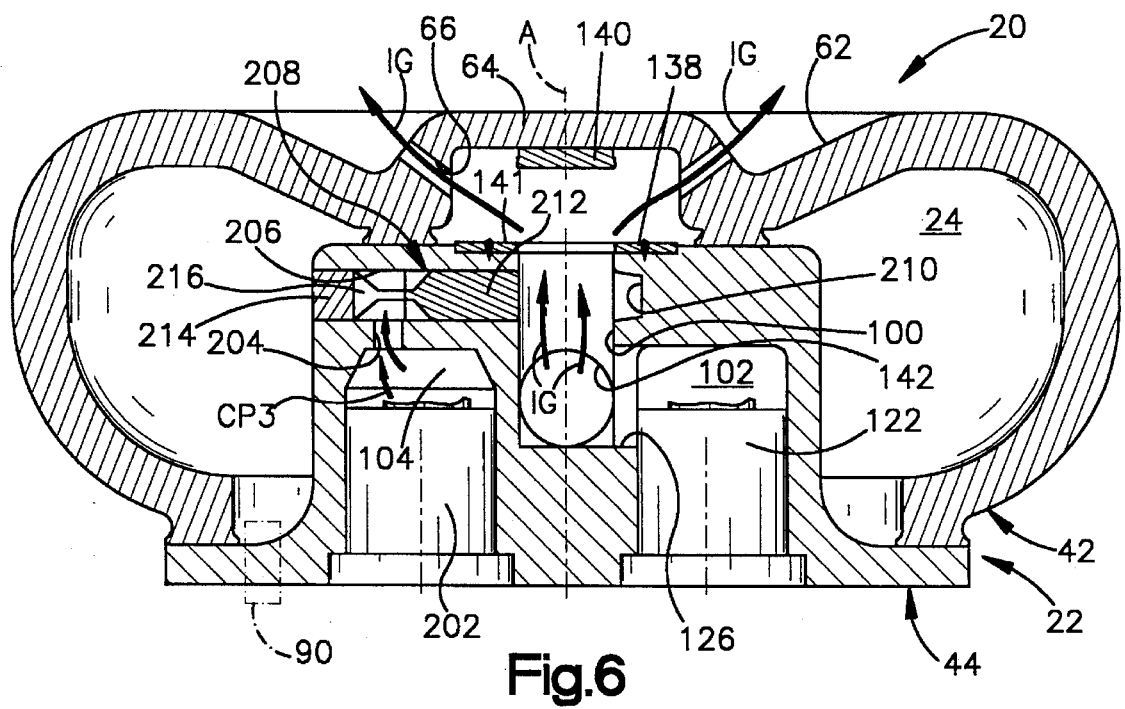
FIGS. 6 and 7 are views similar to FIG. 1 with parts illustrated in different positions.

The closure 140 breaks away from the inner housing portion 44 in response to pressure in the chamber 24 and outlet passage 100 increasing, in a manner described below, to a predetermined second pressure of at least approximately 6,000 psi and preferably 8,000 psi. The closure 140 is movable from the initial position blocking the outlet passage 100, as illustrated in FIG. 1, to a second position, as illustrated in FIG. 6, in which the outlet passage 100 is unblocked. The broken closure 140 moves to the second position while being retained in the diffuser 64. Movement of the closure 140 to the second position provides fluid communication between the toroidal chamber 24 and the diffuser 64 to inflate the air bag B.

The inner housing portion 44 also has a pair of initiator chambers 102, 104 with respective longitudinal central axes D, C extending in a direction substantially parallel to the axis A. The first initiator chamber 102 is in fluid communication with the gas storage chamber 24. The second initiator chamber 104 is isolated from direct fluid communication with the gas storage chamber 24.

An actuatable first initiator 122 is located in the first initiator chamber 102, to the right as viewed in FIG. 1. The first initiator 122 produces combustion products CP1 (FIG. 3), upon actuation, including heat and hot particles. The combustion products CP1 are directed into the outlet passage 100 through a connecting passage 126 extending in a direction transverse to the axis A between the outlet passage and the first initiator chamber 102.

A pair of passage portions 142, 144 (FIG. 2) extend transverse to the axis A and connecting passage 126 in opposite directions from the outlet passage 100. The passage portions 142, 144 provide fluid communication between the toroidal chamber 24 and the outlet passage 100. Each of the passage portions 142, 144 supports a respective one of a pair of plastic caps 162.

The caps 162 are initially located in the passage portions 142, 144 to inhibit fluid flow between the toroidal chamber 24 and the outlet passage 100. Each cap 162 has a tubular body portion 164, a flange portion 166 extending outward from one end of the body portion, and a spacer portion 168 extending axially from the one end of the body portion. The body portion 164 of each cap 162 is initially fully received in its respective passage portion 142, 144. The flange portion 166 of each cap 162 engages the inner housing portion 44 to limit the extent to which the body portion 164 can move into the passage portion 142 or 144.

Each cap 162 is initially held in its respective passage portion 142 or 144 by outwardly expanding spring fingers 182 which extend axially and radially from the tubular body portion 164. The spring fingers 182 are biased in a radially outward direction to engage a surface defining the passage portion 142 or 144 and retain the cap frictionally in the passage portion.

Figure 3:
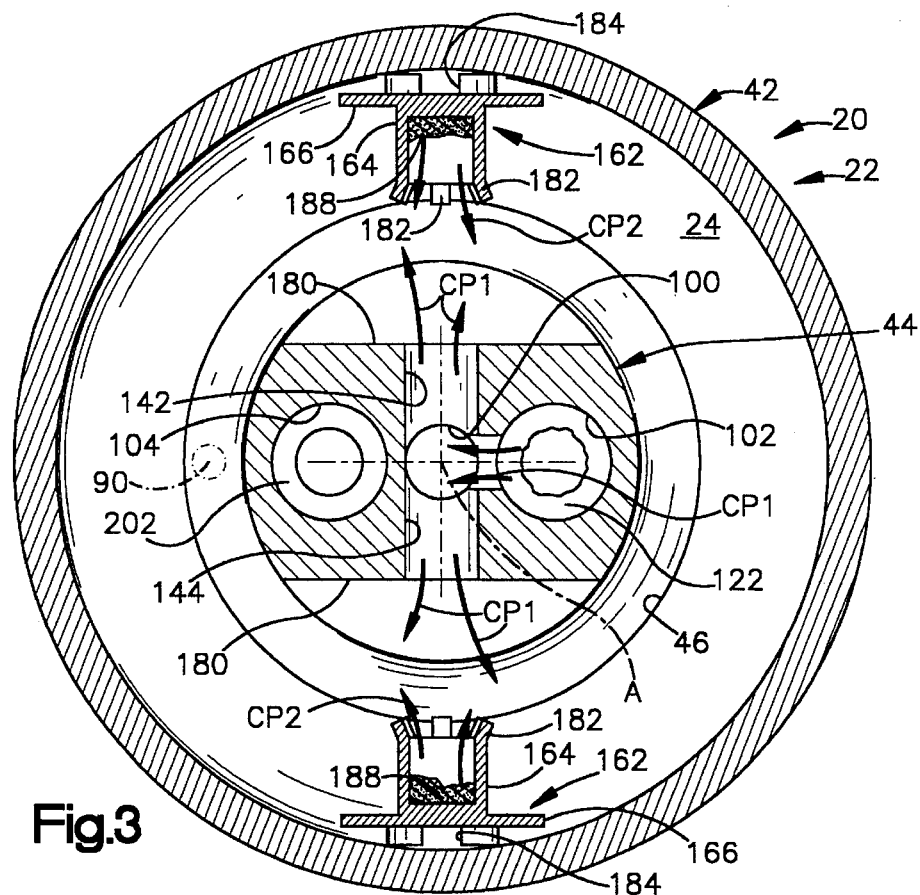
FIGS. 3 and 4 are views similar to FIG. 2 with parts illustrated in different positions.
Figure 4:
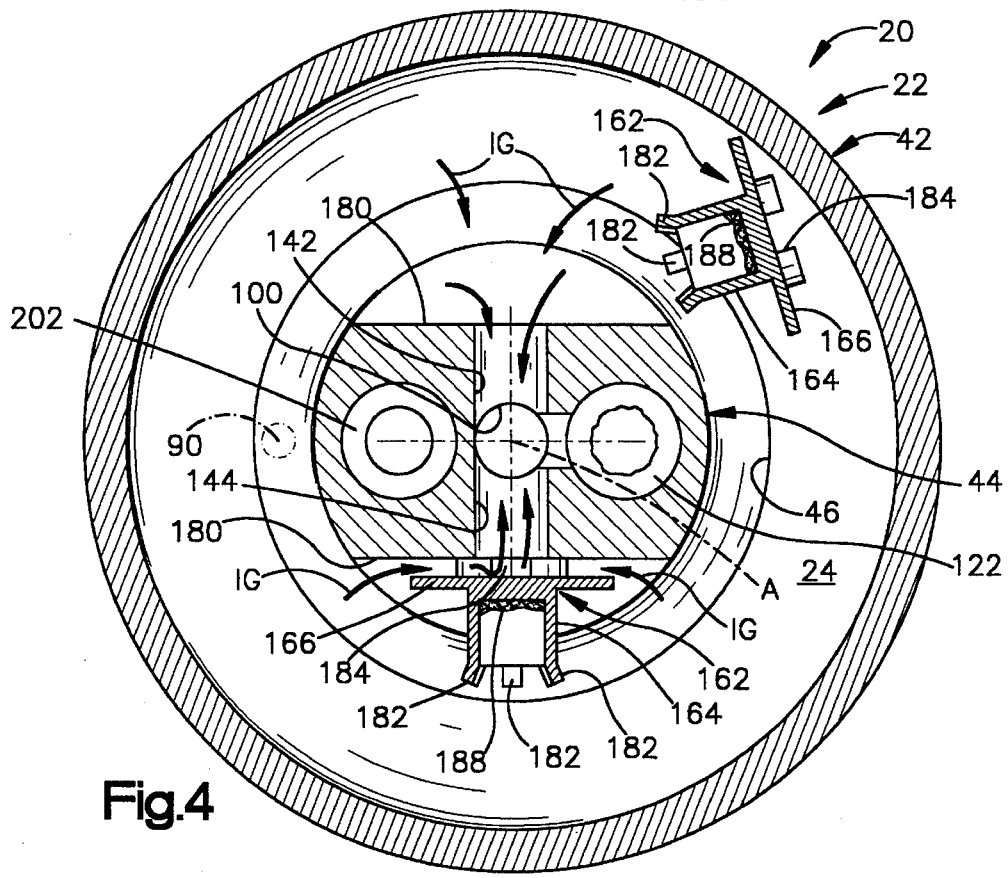

As will be described below, the caps 162 are movable out of the passage portions 142, 144. When the caps 162 move out of the passage portions 142, 144, the spring fingers 182 expand radially outward, as illustrated in FIGS. 3 and 4. The expansion of the spring fingers 182 helps prevent the tubular body portion 164 of the cap 162 from re-entering the passage portions 142, 144 to inhibit fluid flow through the passage portions.

The spacer portion 168 of each cap 162 also helps prevent the cap from closing the combustion passage portion 142, 144 after the cap moves from the passage portion. Specifically, the spacer portion 168 of the cap 162 has a diameter which is larger than the diameter of the passage portions 142, 144. If the cap 162 is forced by fluid flow toward either passage portion 142, 144 with the tubular body portion 164 projecting away from the passage portion, the spacer portion 168 engages the inner housing portion 44 and holds the body portion and the flange portion 166 away from a side surface 180 of the inner housing portion. This situation is illustrated by the lowermost cap in FIG. 4. The spacer 168 has a slotted passage 184 that permits fluid communication with the passage portions 142, 144 in the tubular body portion 164. The slotted passage 184 allows fluid flow from the chamber 24 to the passage portion 142 or 144 in case a cap 162 spans the end of the passage portions, as illustrated in FIG. 4.

A quantity of ignitable material 188 is located in a tubular body portion 164 of each of the caps 162. Upon actuation of the first initiator 122, the combustion products CP1 enter the passage portions 142, 144 through the connecting passage 126 and the closed outlet passage 100. The combustion products CP1 contact and ignite the ignitable material 188 in the caps 162. The ignitable material 188 then produces combustion products CP2, including heat and hot particles, in the passage portions 142, 144 and the outlet passage 100. The combustion products CP2 propel the caps 162 radially outward into the chamber 24, as illustrated in FIG. 3. The ignitable material 188 continues to burn, and the combustion products CP2 are released into the mixture of gases stored in the chamber 24, as illustrated in FIG. 4.

The combustion products CP2 contact and ignite the combustible fuel gas portion of the mixture of gases in the chamber 24. The remaining combustion products CP1 from the first initiator 122 are also directed into the chamber 24 through the passage portions 142, 144 and are available to aid in igniting the combustible fuel gas portion of the mixture of gases. Burning of the combustible fuel gas portion causes the pressure of the noncombustible inflation gas portion IG in the chamber 24, the passage portions 142, 144 and the outlet passage 100 to increase to the predetermined second pressure and break the closure 140 away from the inner housing portion 44, as illustrated in FIG. 6. The mixture of gases, including mostly the noncombustible inflation gas portion IG, flows through the unblocked outlet passage 100 and into the diffuser 64 for inflating the air bag B.

A second actuatable initiator 202 is located in the second initiator chamber 104 in the inner housing portion 44. The second initiator 202 is similar in structure and operation to the first initiator 122. A passage portion 204 extends upward from the top of the second initiator chamber 104, as viewed in FIG. 6. The passage portion 204 is in fluid communication with a passage portion 206 which extends transverse to the axis A and the passage portion 204 in the inner housing portion 44. The passage portion 206 is connected with the outlet passage 100.

A member 208 (FIGS. 1, 5, 6 and 7) located in the transverse passage portion 206 has a movable section 212 attached to a base section 214 by a generally conical connector 216. The movable section 212 is initially located away from the outlet passage 100. The connector 216 is conical to withstand compression when the pressure in the outlet passage 100 acts on the right end surface of the member 208, as viewed in FIG. 6. The connector 216 is frangible to allow the movable section 212 to separate from the base section 214 and move to a location in the transverse passage portion 206 and across the outlet passage 100 to block partially and reduce the flow area of the outlet passage. The movable section 212 includes pressure relief grooves 218 in an end located adjacent the connector 216.

Figure 5:
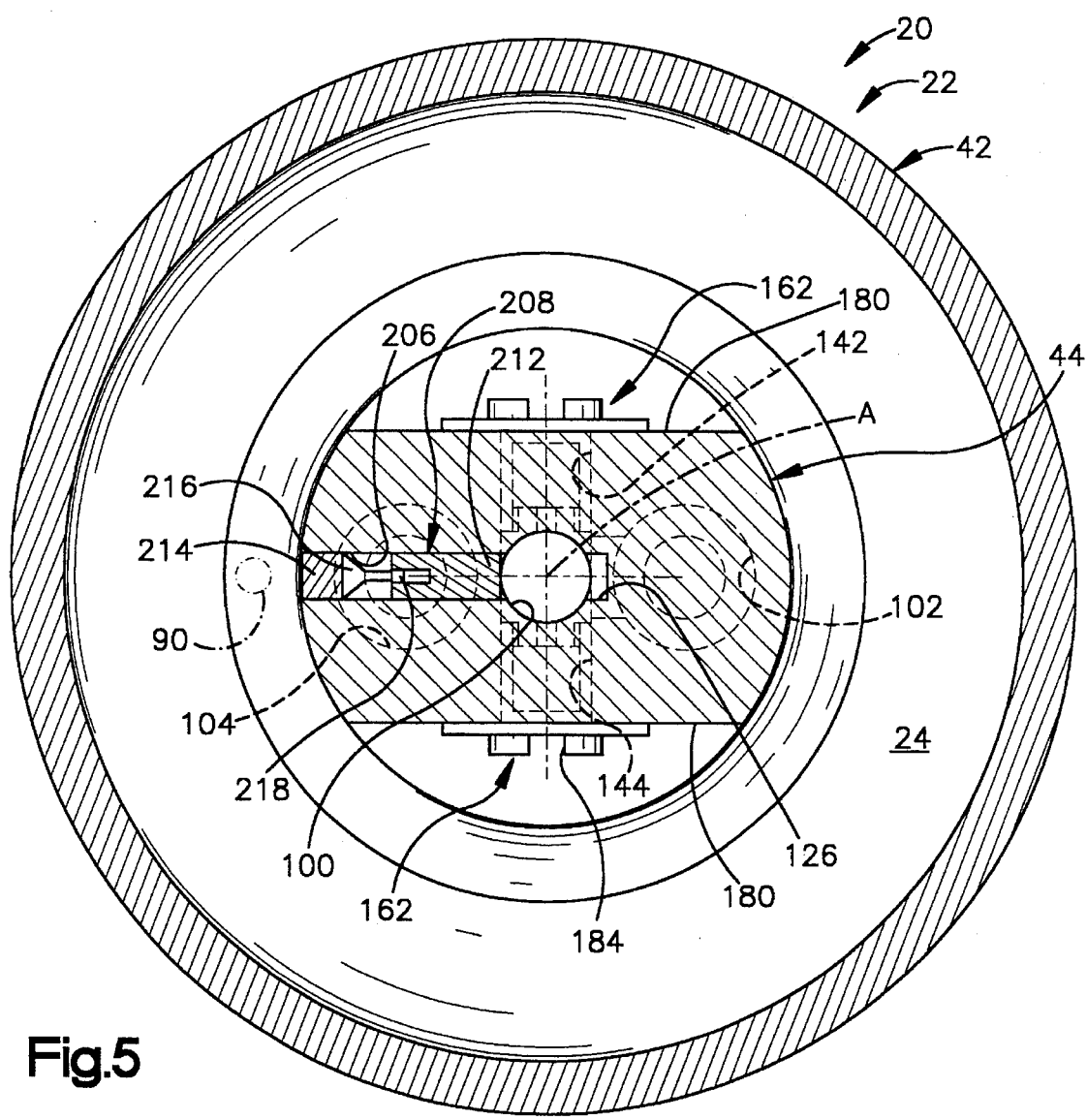
FIG. 5 is a sectional view of the inflator of FIG. 1, taken approximately along the line 5—5 in FIG. 1.

The width of the movable section 212, as viewed in FIG. 5, is less than the diameter of the outlet passage 100, so the movable section does not completely block fluid flow through the outlet passage. The movable section 212 fits tightly within the transverse passage portion 206 of the second initiator chamber 104 so little or no fluid leakage occurs between the movable section and surfaces defining the transverse passage portion. Thus, any fluid pressure in the second initiator chamber 104 acts mostly on the movable section 212, as viewed in FIGS. 1 and 5–7.

Figure 7:
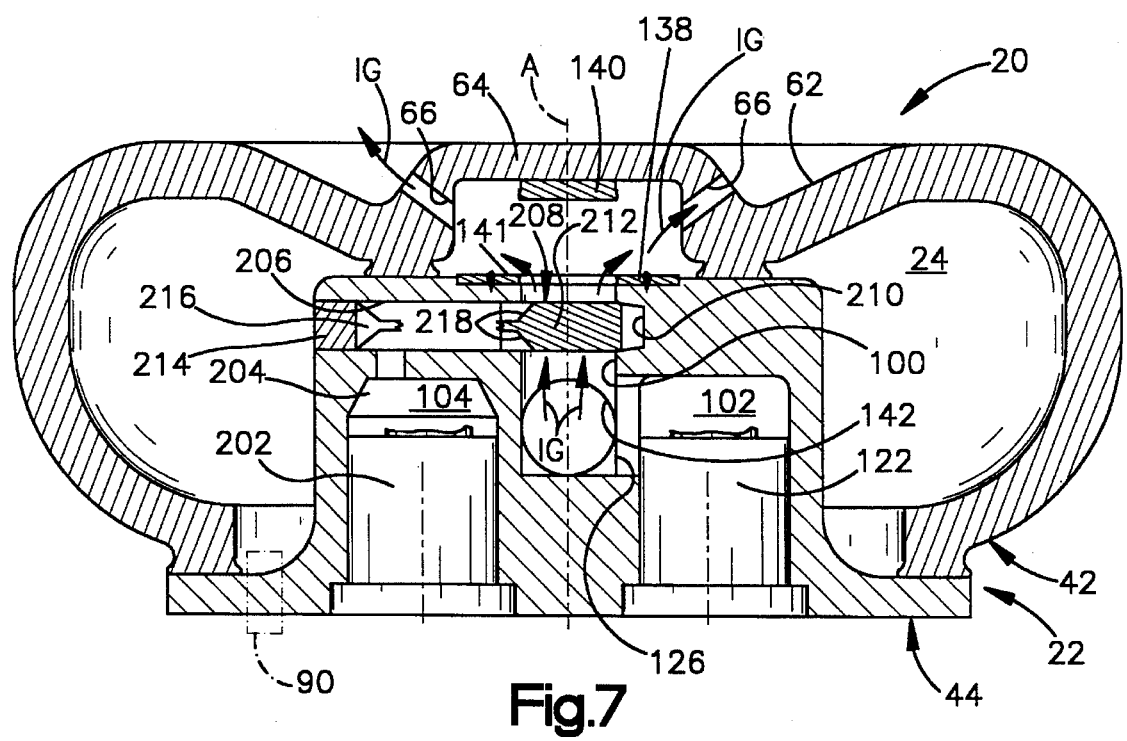

The movable section 212 of the member 208 moves in response to actuation of the second initiator 202. Upon actuation, the second initiator 202 produces combustion products CP3 which are released into the second initiator chamber 104, as illustrated in FIG. 6. The combustion products CP3 are conducted through the passage portion 204 and into the transverse passage portion 206. The resulting increased pressure in the passage portion 206 acts on the left end surface of the movable section 212 to break the connector 216 and move the movable section to the right and into the outlet passage 100, as illustrated in FIG. 7. The movable section 212 of the member 208 moves into a wedge-shaped recess 210 which guides and stops movement of the movable section. When the movable section 212 moves into the recess 210, the pressure relief grooves 218 allow any remaining combustion products CP3 to flow to the outlet passage 100.

The second initiator 202 may be actuated simultaneously with or slightly after actuation of the first initiator 122 in order to slow the inflation of the air bag B. Specifically, the first initiator 122 is actuated to start inflation of the air bag B at a maximum rate. The second initiator 202 is then actuated if a controller (not shown), which is operatively connected with the initiators, determines that flow restriction of the outlet passage 100 is required. Restricting the flow area of the outlet passage 100 increases the time duration to inflate the air bag B fully. The time to inflate the air bag B fully can be varied as conditions of the vehicle warrant by controlling the time after actuation of the first initiator 122 at which the second initiator 202 is actuated. Moving the movable section 212 of the member 208 to restrict the outlet passage 100 slows the flow of the inflation gas IG into the air bag B.

The first initiator 122 (FIG. 1) is attached to the controller by lead wires 242. The second initiator 202 is connected to the controller by lead wires 244. The controller is in electrical communication with a condition sensor (not shown). The controller is also in electrical communication with a collision sensor (not shown). When the collision sensor communicates a signal to the controller indicating that a collision requiring inflation of the air bag B has started, the controller triggers actuation of the first initiator 122.

The controller uses a signal from the condition sensor to calculate if actuation of the second initiator 202 is required and how much of a time delay is to occur between actuation of the first initiator 122 and actuation of the second initiator. This time delay enables the inflator 20 to tailor the inflation of the air bag by controlling the inflation fluid pressure in the air bag as a function of time. The inflation fluid pressure delivered to the air bag as a function of time depends on at least one of various factors, such as occupant weight, distance that the occupant is from the air bag, position or orientation of the occupant on a vehicle seat, vehicle speed, severity of the crash, temperature within the passenger compartment, and the like. Any or all of these factors, which can be sensed by the condition sensor, can be used by the controller to calculate the time delay for actuating the second initiator 202 after actuation of the first initiator 122. It will be apparent that more than one condition sensor may be necessary if a plurality of these factors are used by the controller to calculate the time delay.

In operation, the controller has at least one signal communicated over a wire from the condition sensor, which may be indicative of at least one factor at the time of a collision requiring inflation of the air bag. Other conditions may be sensed and input to the controller. The controller then calculates a time delay, if any, between actuation of the initiator 122 and actuation of the second initiator 202.

The first initiator 122 is actuated to effect movement of the closure 140 away from the inner housing portion 44. The first initiator 122 produces combustion products CP1 which enter the closed outlet passage 100 and passage portions 142, 144 to ignite the ignitable material 188 in the caps 162. The ignitable material 188 produces combustion products CP2. The combustion products CP2 propel the caps 162 into the chamber 24, as illustrated in FIG. 3. The ignitable material 188 continues to burn and the combustion products CP2 contact and ignite the combustible fuel gas portion of the mixture of gases in the chamber 24.

Burning of the combustible fuel gas portion causes the pressure of the noncombustible inflation gas portion IG in the chamber 24, the passage portions 142, 144 and the outlet passage 100 to increase to the predetermined second pressure and break the closure 140 away from the inner housing portion 44, as illustrated in FIG. 6. When the closure 140 moves to unblock the outlet passage 100, fluid communication is provided between the chamber 24 and the diffuser 64. The inflation gas IG in the chamber 24 flows into the diffuser 64 through the passage portions 142, 144 and the outlet passage 100. The inflation gas IG is directed into the air bag B to inflate the air bag at a maximum rate.

After actuation of the first initiator 122, the second initiator 202 may be actuated if and when the controller determines that actuation of the second initiator is needed. When the second initiator 202 is actuated, the combustion products CP3 break the connector 216 and move the movable section 212 of the member 208 across the outlet passage 100. The movable section 212 restricts flow through the outlet passage 100 to inflate the air bag B with a desired pressure profile.

From the above description of the invention, those skilled in the art will perceive improvements, changes and modifications. For example, although the chamber 24 is described as receiving and storing the mixture of gases, the gases could be stored at another location in the vehicle and then delivered to the chamber upon the occurrence of a collision. Such improvements, changes and modifications within the skill of the art are intended to be covered by the appended claims.

Having described the invention, the following is claimed:

1. An apparatus comprising:
   an inflatable air bag;
   a container defining a chamber;
   a mixture of gases in the chamber and comprising a combustible fuel gas portion and a noncombustible inflation gas portion;
   an outlet passage in said container for providing fluid communication through a flow area between the chamber and the air bag, said outlet passage being initially blocked to prevent fluid flow through said outlet passage;
   an actuatable first initiator for, when actuated, effecting the ignition of the combustible fuel gas portion of the mixture of gases to unblock said outlet passage and allow gas to flow into said air bag; and
   an actuatable second initiator for, when actuated, changing the flow area defined by said outlet passage.

2. The apparatus of claim 1 wherein said container defines a chamber for said first initiator and further including a closure extending across said outlet passage to block fluid flow through the outlet passage, said closure being movable to unblock said outlet passage in response to an increase in pressure of the mixture of gases in the chamber upon ignition of the combustible fuel gas portion.

3. The apparatus of claim 2 further including a flow passage extending between the chambers, a cap located in the flow passage, and a quantity of ignitable material in said cap which ignites in response to actuation of said first initiator to propel said cap into the chamber for the mixture of gases and ignite the combustible fuel gas portion of the mixture of gases for increasing the pressure of the mixture of gases to a pressure which moves the closure to unblock the outlet passage.

4. The apparatus of claim 2 wherein the chamber for the mixture of gases is toroidal and surrounds the chamber for said first initiator.

5. The apparatus of claim 1 wherein said container defines another chamber for said second initiator and a passage extending between the chambers and further including a member located in said passage extending between said chambers, said member having a section movable from an initial position out of said outlet passage to a position at least partially in said outlet passage to reduce the flow area of said outlet passage in response to actuation of said second initiator.

6. The apparatus of claim 1 wherein said second initiator is actuated after actuation of said first initiator.

7. An inflator for inflating an air bag, said inflator comprising:
   a container defining an initially closed and substantially toroidal chamber;
   a mixture of gases in the chamber and comprising a combustible gas portion and a noncombustible inflation gas portion;
   an actuatable first initiator for, when actuated, effecting the ignition of the combustible gas portion of the mixture of gases to open the closed chamber and permit gas to flow into the air bag through a flow area; and
   an actuatable second initiator for, when actuated, decreasing the flow area through which the gas flows.

8. The apparatus of claim 7 wherein said container defines a chamber for said first initiator and further including an outlet passage to provide fluid communication between the toroidal chamber and the air bag and a closure extending across the outlet passage to initially block flow through the outlet passage, said closure being movable to unblock the outlet passage in response to an increase in pressure of the mixture of gases resulting from actuation of said first initiator.

9. The apparatus of claim 8 further including a flow passage extending between the chambers, a cap located in the flow passage, and a quantity of ignitable material in said cap which ignites in response to actuation of said first initiator to propel said cap into the toroidal chamber to ignite the combustible portion of the mixture of gases and increase the pressure of the mixture of gases to move the closure and open the closed chamber.

10. The apparatus of claim 7 wherein said container defines another chamber for said second initiator and a passage extending between the chambers, and further including a member located in said passage extending between said chambers, said member having a section movable from an initial position to a position at which the flow area is decreased in response to actuation of said second initiator.

11. The apparatus of claim 7 wherein said second initiator is actuated after actuation of said first initiator.

12. An inflator for inflating an air bag, said inflator comprising:

a container defining a storage chamber;

a combustible gas mixture in the storage chamber and comprising a combustible gas portion and a noncombustible inflation gas portion;

an outlet passage in said container to provide fluid communication between the storage chamber and the air bag, the outlet passage being initially blocked to prevent fluid flow through said outlet passage;

an actuatable first initiator located within the boundary of said container which defines the storage chamber and being in fluid communication with the storage chamber for, when actuated, effecting the ignition of the combustible gas portion of the gas mixture to unblock said outlet passage and allow the gas to flow through said outlet passage; and an actuatable second initiator located within the boundary of said container which defines the storage chamber for, when actuated, changing the speed at which the air bag becomes fully inflated.

13. The apparatus of claim 12 wherein said container defines a chamber for said first initiator and further including a closure extending across the outlet passage to block fluid flow through the outlet passage, said closure being movable to unblock the outlet passage in response to an increase in pressure in the gas mixture resulting from actuation of said first initiator.

14. The apparatus of claim 13 further including a flow passage extending between the chambers, a cap located in the flow passage, and a quantity of ignitable material in said cap which ignites in response to actuation of said first initiator to propel said cap into the storage chamber to ignite the combustible gas portion and increase the pressure of the gas mixture in the storage chamber to unblock the outlet passage.

15. The apparatus of claim 12 wherein the chamber for the gas mixture is toroidal and surrounds the chamber for said first initiator.

16. The apparatus of claim 12 wherein said container defines another chamber for said second initiator and a passage extending between the chambers and further including a member located in said passage extending between said chambers, said member having a section movable from an initial position out of the outlet passage to a position at least partially in the outlet passage to reduce the flow area of the outlet passage in response to actuation of said second initiator.

17. The apparatus of claim 12 wherein said second initiator is actuated after actuation of said first initiator.

18. An inflator for inflating an air bag, said inflator comprising:

a container defining an initially closed and substantially toroidal chamber;

a gas mixture in the toroidal chamber and comprising a combustible fuel gas portion and a noncombustible inflation gas portion for inflating an air bag;

an actuatable first initiator for, when actuated, effecting the ignition of the combustible fuel gas portion of the gas mixture to open the closed toroidal chamber and permit inflation gas to flow into the air bag;

said container defining an outlet passage and a first initiator chamber for said first initiator, said first initiator chamber in fluid communication with the outlet passage, said container further including a closure extending across the outlet passage to block fluid flow through the outlet passage, said closure being movable to unblock the outlet passage and open the closed toroidal chamber in response to actuation of said first initiator;

a flow passage extending between the first initiator chamber and the toroidal chamber, a cap located in the flow passband, and a quantity of ignitable material in said cap which ignites in response to actuation of said first initiator to propel said cap into the toroidal chamber to ignite the combustible fuel gas portion of the gas mixture and increase the pressure of the gas mixture to move the closure and unblock the outlet passage; and an actuatable second initiator for, when actuated after actuation of said first initiator, controlling the pressure in the air bag as a function of time.

19. The apparatus of claim 18 wherein said cap further includes at least one portion that is biased to move in a direction transverse relative to the direction along which said cap is propelled.

20. The apparatus of claim 18 wherein said container defines another chamber for said second initiator and a passage extending between the chambers and further including a member located in said passage extending between said chambers, said member having a section movable from an initial position out of the outlet passage to a position at least partially in the outlet passage to reduce the flow area of the outlet passage in response to actuation of said second initiator.

21. The apparatus of claim 18 wherein said second initiator is actuated after actuation of said first initiator.

\* \* \* \* \*